US011415007B2

(12) United States Patent
Whittle et al.

(10) Patent No.: US 11,415,007 B2
(45) Date of Patent: Aug. 16, 2022

(54) TURBINE ENGINE WITH REUSED SECONDARY COOLING FLOW

(71) Applicant: Rolls-Royce plc, London (GB)

(72) Inventors: Michael J. Whittle, London (GB); Keith Sadler, London (GB); Matthew D. Thomason, London (GB); Andrew Holt, London (GB)

(73) Assignee: Rolls-Royce plc

( * ) Notice: Subject to any disclaimer, the term of this patent is extended or adjusted under 35 U.S.C. 154(b) by 22 days.

(21) Appl. No.: 16/752,183

(22) Filed: Jan. 24, 2020

(65) Prior Publication Data

US 2021/0231022 A1 Jul. 29, 2021

(51) Int. Cl.
| | |
|---|---|
| *F01D 9/04* | (2006.01) |
| *F01D 5/28* | (2006.01) |
| *F01D 11/08* | (2006.01) |
| *F01D 25/24* | (2006.01) |
| *F01D 25/12* | (2006.01) |

(52) U.S. Cl.
CPC ............ *F01D 9/041* (2013.01); *F01D 5/284* (2013.01); *F01D 5/282* (2013.01); *F01D 11/08* (2013.01); *F01D 25/12* (2013.01); *F01D 25/246* (2013.01); *F05D 2220/323* (2013.01); *F05D 2230/60* (2013.01); *F05D 2240/11* (2013.01); *F05D 2240/12* (2013.01); *F05D 2240/55* (2013.01); *F05D 2240/81* (2013.01); *F05D 2260/20* (2013.01); *F05D 2300/6033* (2013.01)

(58) Field of Classification Search
CPC .......... F01D 11/08; F01D 11/24; F01D 25/12; F01D 25/246; F05D 2230/60; F05D 2240/12; F05D 2240/81; F05D 2260/20
See application file for complete search history.

(56) References Cited

U.S. PATENT DOCUMENTS

| | | |
|---|---|---|
| 4,017,207 A | 4/1977 | Bell et al. |
| 6,612,806 B1 | 9/2003 | Tieman et al. |
| 6,840,737 B2 * | 1/2005 | Flatman ................. F01D 5/187 |
| | | 415/116 |
| 6,899,518 B2 | 5/2005 | Lucas et al. |
| | (Continued) | |

FOREIGN PATENT DOCUMENTS

RU 2387846 4/2010

*Primary Examiner* — Eldon T Brockman
*Assistant Examiner* — Danielle M. Christensen
(74) *Attorney, Agent, or Firm* — Barnes & Thornburg LLP

(57) ABSTRACT

A gas turbine engine includes a shroud ring, a vane ring, and a secondary flow assembly. The shroud ring extends around an associated turbine wheel and includes a carrier segment and a blade track segment comprising ceramic matrix composite materials. The blade track segment and the carrier segment defining a shroud cavity radially therebetween. The vane ring includes a heat shield comprising ceramic matrix composite materials that forms an outer platform, an inner platform, and an airfoil defining a heat shield cavity radially through the heat shield. The secondary flow assembly includes a recirculating flow circuit having a discharge tube and a vane pressurizing tube; and the secondary flow assembly is configured to cool the blade track segment. The flow circuit is further configured to pressurize the heat shield cavity thereby providing a seal against the gases from the primary gas path entering the heat shield cavity.

18 Claims, 4 Drawing Sheets

(56) References Cited

U.S. PATENT DOCUMENTS

| | | | |
|---|---|---|---|
| 7,520,715 B2 | 4/2009 | Durocher et al. | |
| 7,740,444 B2 | 6/2010 | Lee et al. | |
| 7,921,654 B1* | 4/2011 | Liang | F01D 9/041 |
| | | | 60/806 |
| 8,517,686 B2* | 8/2013 | Allen-Bradley | F04D 29/681 |
| | | | 416/193 A |
| 8,961,108 B2 | 2/2015 | Bergman et al. | |
| 9,670,785 B2 | 6/2017 | Johns et al. | |
| 9,915,159 B2* | 3/2018 | Huizenga | F01D 25/16 |
| 10,196,917 B2 | 2/2019 | Lutjen et al. | |
| 2004/0101400 A1* | 5/2004 | Maguire | F01D 11/08 |
| | | | 415/116 |
| 2012/0257954 A1 | 10/2012 | Chanteloup et al. | |
| 2016/0290157 A1* | 10/2016 | Ning | F01D 11/08 |
| 2020/0040750 A1* | 2/2020 | Greene | F01D 11/005 |
| 2020/0263557 A1* | 8/2020 | Whittle | F01D 9/065 |

\* cited by examiner

TURBINE ENGINE WITH REUSED SECONDARY COOLING FLOW

FIELD OF THE DISCLOSURE

The present disclosure relates generally to cooling systems adapted for use in gas turbine engines, and more specifically to cooling systems used with components that comprise ceramic materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils and other nearby components heats the airfoils and components to temperatures that require high-temperature resistant materials and/or active cooling. One such set of high-temperature resistant materials are ceramic matrix composites. Design of active cooling systems to be used in turbine engines with ceramic matrix composites presents unique challenges and opportunities.

SUMMARY

The present disclosure may comprise one or more of the following features and combinations thereof.

A gas turbine engine may include a shroud ring, a vane ring, and a secondary flow assembly. The shroud ring may include a carrier segment and a blade track segment, the blade track segment and the carrier segment defining a shroud cavity radially therebetween. The blade track segment may interact with the gases flowing along a primary gas path of the gas turbine engine. The vane ring may include a heat shield comprising ceramic matrix composite materials that forms an outer platform, an inner platform, and an airfoil defining a heat shield cavity radially through the heat shield. The secondary flow assembly may include a recirculating flow circuit that may cool the shroud ring and may pressurize the heat shield cavity.

In some embodiments, the shroud ring may extend around an associated turbine wheel and to block gases from passing around blades of the associated turbine wheel without interacting with the blades. The carrier segment may be coupled to a turbine case and the blade track segment may comprise ceramic matrix composite materials and may be mounted to the turbine case via the carrier segment.

In some embodiments, the outer platform may define an outer boundary of the primary gas path, the inner platform may be radially spaced apart from the outer platform and may define an inner boundary of the primary gas path. The airfoil may extend radially between the outer platform. The inner platform, the airfoil, the outer platform, and the inner platform may define the heat shield cavity.

In some embodiments, the recirculating flow circuit may have a compressor discharge tube extending from a compressor of the gas turbine engine to the shroud cavity and a vane pressurizing tube extending from the shroud cavity to the heat shield cavity. The recirculating flow circuit may carry a first cooling air flow from the compressor into the shroud cavity via the compressor discharge tube so that the blade track segment is cooled. The circuit may also carry a pressurizing air flow flowing from the shroud cavity into the heat shield cavity via the vane pressurizing tube so that the heat shield cavity is pressurized thereby providing a seal against the gases from the primary gas path entering the heat shield cavity.

In some embodiments, the gas turbine engine a temperature of the pressurizing air flow may be greater than a temperature of a majority portion of the airfoil during a max takeoff use condition of the gas turbine engine such that the pressurizing air flow is primarily effective to pressurize the heat shield cavity and is not effective for cooling the majority portion of the airfoil during the max takeoff use condition.

In some embodiments, the recirculating flow circuit may further include a focused cooling tube connected to the vane pressurizing tube and extending from the vane pressurizing tube into the heat shield cavity. The focused cooling tube may direct the pressurizing air flow onto a minority portion of the airfoil that is at a temperature greater than the temperature of the pressurizing air flow during the max takeoff use condition so as to provide a focused cooling flow.

In some embodiments, the airfoil may include a leading edge, a trailing edge axially spaced apart from the leading edge, a pressure side located between the leading edge and the trailing edge, and a suction side spaced apart from the pressure side and located between the leading edge and the trailing edge. The gases flowing along the primary gas path may exert a pushing force on the leading edge and on the pressure side.

In some embodiments, the minority portion of the airfoil may be located at a radially central portion of the airfoil located on at least one of the leading edge and the pressure side.

In some embodiments, the trailing edge may include a plurality of exit holes arranged radially along the trailing edge. The focused cooling flow may flow out of the heat shield cavity via the plurality of exit holes.

In some embodiments, the vane ring further may include a spar comprising metallic materials and located in the heat shield cavity, the spar extending radially through the outer platform, the heat shield cavity, and the inner platform. The spar may receive force loads applied to the airfoil by the gases flowing along the primary gas path when the gas turbine engine is in use.

In some embodiments, the secondary flow assembly may further include a cooling flow circuit, the cooling flow circuit having a cooling flow tube extending from the compressor to a blade interior cavity of a rotating blade of the turbine, the blade configured to rotate within the shroud ring. The cooling flow circuit may cool the blade with second cooling air flow from the compressor.

In some embodiments, a temperature of the second cooling air flow may be less than a temperature of the first cooling air flow.

In some embodiments, the first cooling air flow may be discharged from a compressor exit of the compressor when the gas turbine engine is in use.

According to another aspect of the present disclosure, a turbine assembly may include a shroud ring assembly, a vane ring assembly, and a secondary flow assembly. The shroud ring assembly may include a carrier segment and a blade track segment comprising ceramic matrix composite materials. The vane ring assembly may include a first heat shield comprising ceramic matrix composite materials and may include a first airfoil defining a first heat shield cavity within the first airfoil radially through the first heat shield.

In some embodiments, the secondary flow assembly may include a recirculating flow circuit. The recirculating flow circuit may have (i) a discharge tube that extends to the shroud ring assembly and (ii) a vane pressurizing tube that extends from the shroud ring assembly to the first heat shield cavity. The recirculating flow circuit may carry a first pressurizing air flow that pressurizes the first heat shield cavity and seals against gases flowing along the primary gas path entering the first heat shield cavity In some embodiments, the turbine section a temperature of the first pressurizing air flow may be greater than a temperature of a majority portion of the first airfoil.

In some embodiments, the blade track segment and the carrier segment may define a shroud cavity. The discharge tube may discharge into the shroud cavity and the recirculating flow circuit may cool the shroud ring assembly with a first cooling air flow flowing into the shroud cavity via the discharge tube. The first pressurizing air flow may flow from the shroud cavity into the heat shield cavity via the vane pressurizing tube.

In some embodiments, the recirculating flow circuit may further include a first focused cooling tube connected to the vane pressurizing tube and extending from the vane pressurizing tube into the first heat shield cavity, the first focused cooling tube configured to direct a focused cooling flow onto a minority portion of the airfoil that is at a temperature greater than the temperature of the first pressurizing air flow during a maximum takeoff use condition so as to provide a focused cooling flow.

In some embodiments, the recirculating flow circuit may further include a bypass tube extending between a discharge end of the discharge tube and an inlet end of the vane pressurizing tube.

In some embodiments, the vane ring assembly may further include a second heat shield having a second airfoil defining a second heat shield cavity within the second airfoil radially through the second heat shield. The second heat shield may be arranged axially upstream of the shroud ring assembly and the first heat shield relative to the primary gas path.

In some embodiments, the discharge tube may include a first portion and a second portion. The first portion may discharge into the second heat shield cavity and the second portion may extend from the second heat shield cavity to the bypass tube. The recirculating flow circuit may pressurize the second heat shield cavity and seal against gases flowing along the primary gas path entering the second heat shield cavity with a second pressurizing air flow flowing into the second heat shield cavity via the first portion of the discharge tube. The second pressurizing air flow may flow from the second heat shield cavity through the second portion of the discharge tube and through the bypass tube to the inlet end of the vane pressurizing tube.

In some embodiments, the recirculating flow circuit may further include at least one of a first focused cooling tube and a second focused cooling tube. The first focused cooling tube may be connected to the vane pressurizing tube and extends from the vane pressurizing tube into the first heat shield cavity. The first focused cooling tube may direct a first focused cooling flow onto a first minority portion of the first airfoil that is at a temperature greater than the temperature of the first pressurizing air flow during the max takeoff use condition so as to provide a focused cooling flow. The second focused cooling tube may be connected to the first portion of the discharge tube and extends from the first portion of the discharge tube into the second heat shield cavity. The second focused cooling tube may direct a second focused cooling flow onto a second minority portion of the second airfoil that is at a temperature greater than the temperature of the second pressurizing air flow during the max takeoff use condition so as to provide a focused cooling flow.

In some embodiments, the vane ring assembly may further include a spar comprising metallic materials and located in the first heat shield cavity, the spar extending radially through the first heat shield cavity. The spar may include a spar cavity extending longitudinally through the spar. The spar may receive force loads applied to the first airfoil by the gases flowing along the primary gas path when the gas turbine engine is in use. The secondary flow assembly may further include a cooling flow circuit, the cooling flow circuit having a cooling flow tube extending from a second upstream stage of the gas turbine engine into the spar cavity. The cooling flow circuit may cool the spar with a second cooling flow flowing into the spar cavity via the cooling flow tube.

According to another aspect of the present disclosure, a method may include several steps. The method may include providing a shroud ring assembly, providing a vane ring assembly, cooling the shroud ring assembly, and pressurizing the heat shield cavity.

In some embodiments, the shroud assembly of the gas turbine engine may include a carrier segment and a blade track segment comprising ceramic matrix composite materials, the blade track segment and the carrier segment defining a shroud cavity.

In some embodiments, the vane ring assembly of the gas turbine engine may include a heat shield comprising ceramic matrix composite and having an airfoil defining a heat shield cavity within the airfoil radially through the heat shield.

In some embodiments, the step of cooling may include cooling the shroud ring assembly with a cooling air flow flowing from an upstream stage of the gas turbine engine to the shroud cavity via a discharge tube of a recirculating flow circuit of a secondary flow assembly of the gas turbine engine, the discharge tube extending from the upstream stage of the gas turbine engine to the shroud cavity and discharging into the shroud cavity.

In some embodiments, the step of pressurizing may include pressurizing the heat shield cavity with a pressurizing air flow flowing from the shroud cavity into the heat shield cavity via a vane pressurizing tube of the recirculating flow circuit, the vane pressurizing tube extending from the shroud cavity to the heat shield cavity and discharging into the heat shield cavity.

These and other features of the present disclosure will become more apparent from the following description of the illustrative embodiments.

DETAILED DESCRIPTION OF THE DRAWINGS

Figure 1:
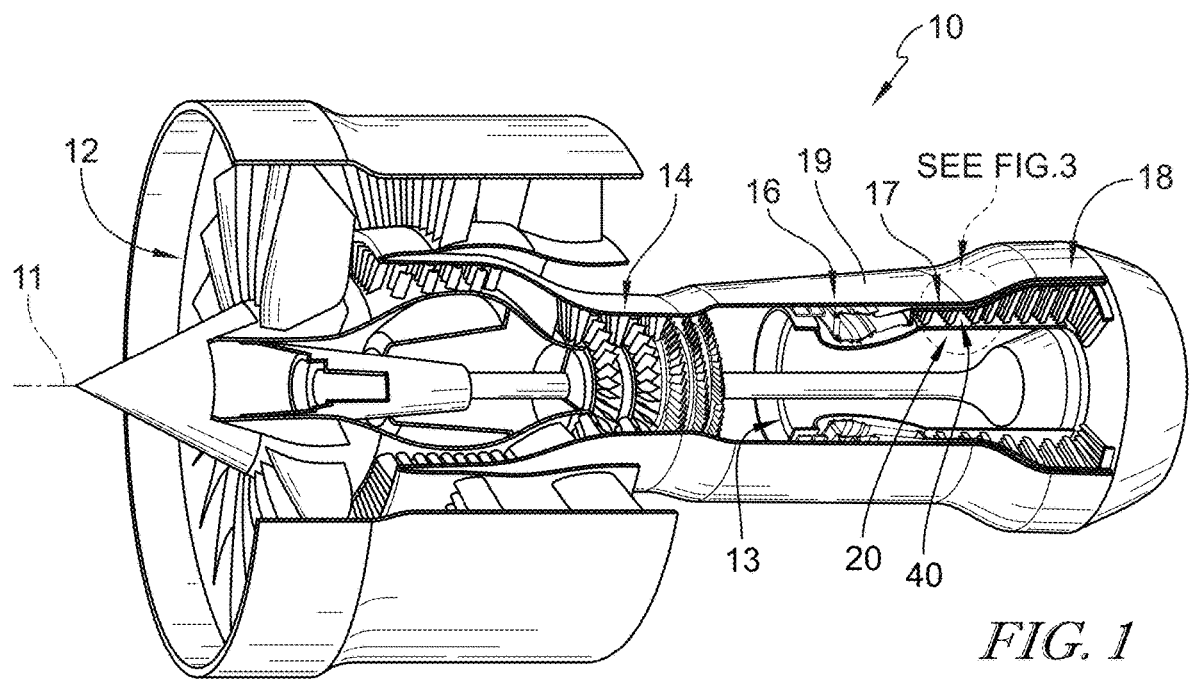
FIG. 1 is a cut-away perspective view of a gas turbine engine showing a fan driven by an engine core having a compressor, a combustor, a turbine, and a secondary flow assembly that extends into the turbine as shown in FIGS. 2 and 3.

For the purposes of promoting an understanding of the principles of the disclosure, reference will now be made to a number of illustrative embodiments illustrated in the drawings and specific language will be used to describe the same.

Figure 2:
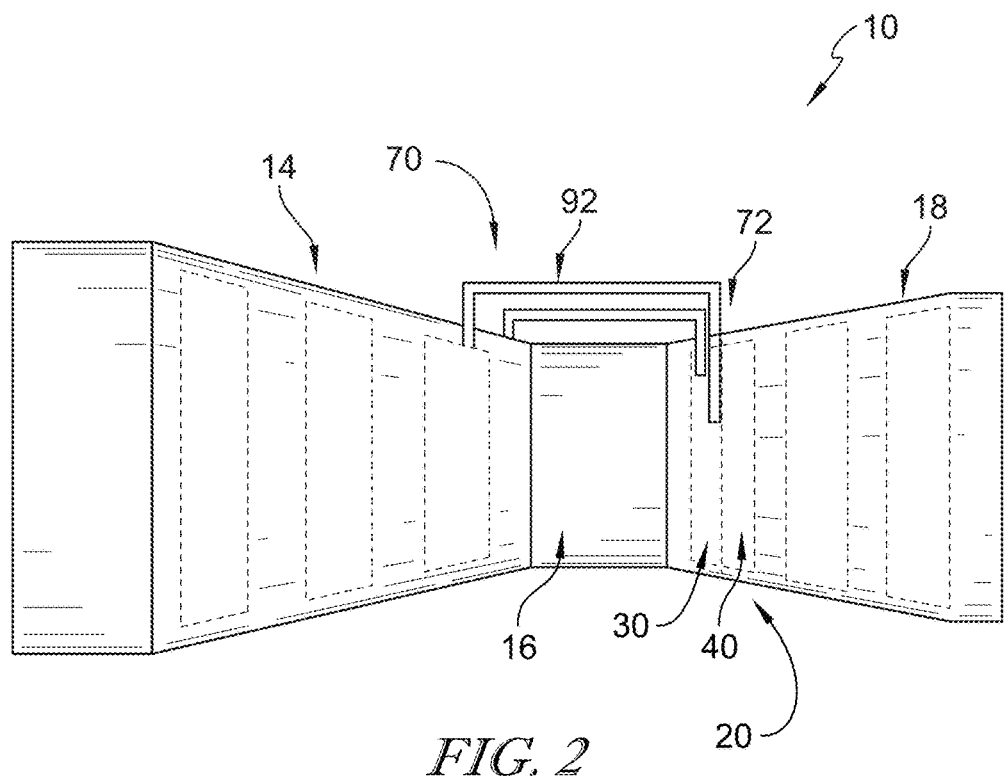
FIG. 2 is a partially schematic view of the gas turbine engine in FIG. 1, showing the fan, the compressor, the combustor, the turbine, and the secondary flow assembly fluidly and interconnecting the compressor and the turbine.
Figure 3:
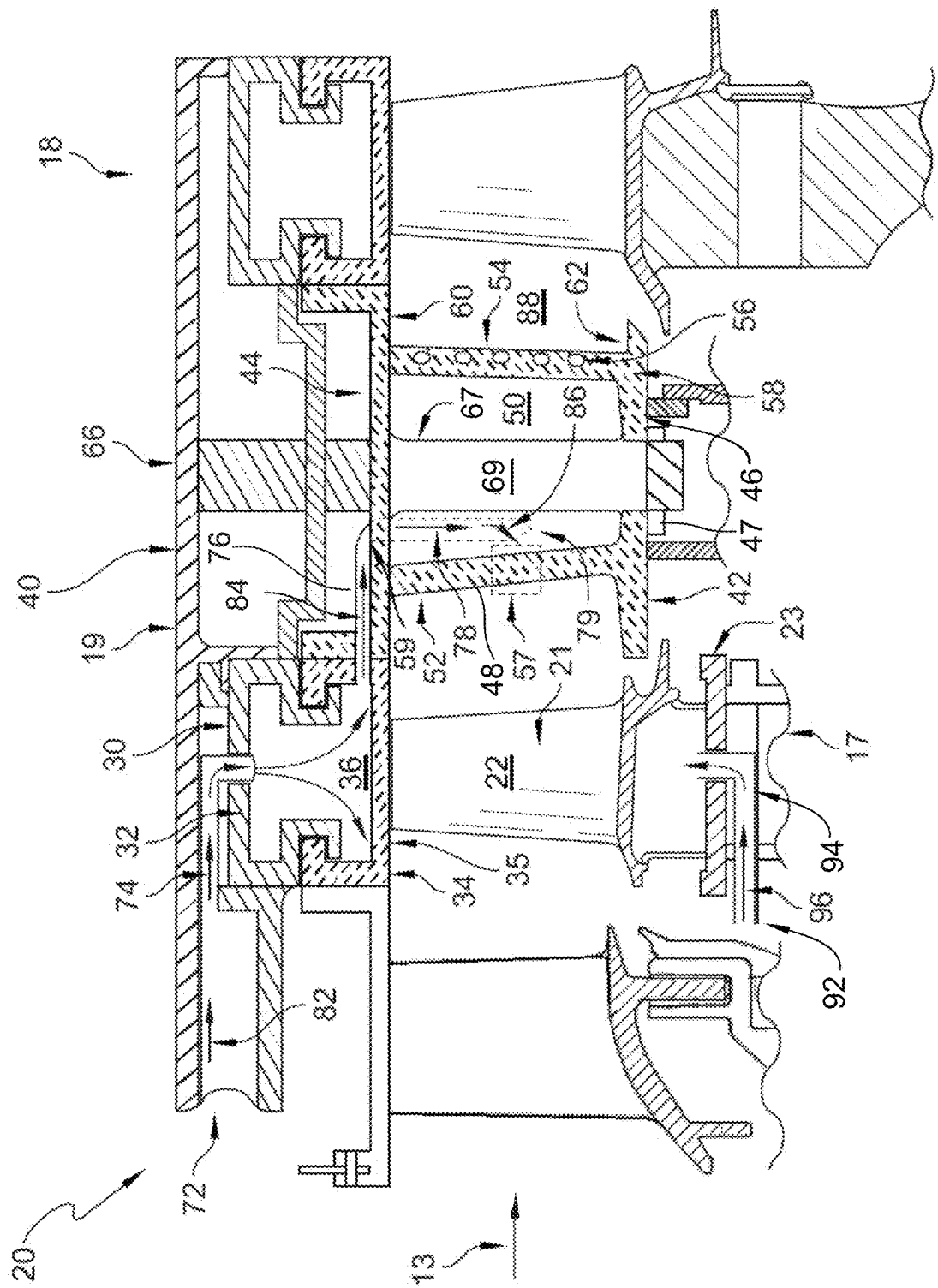
FIG. 3 is a detailed cross-section view of a portion of the gas turbine engine in FIG. 1 showing that compressed air from the compressor entering the turbine is discharged first into a shroud ring assembly to cool ceramic matrix composite blade track segments facing a primary gas path of the engine before being recirculated into a ceramic matrix composite heat shield assembly associated with a turbine vane, where the heated, compressed air is used to pressurize the ceramic matrix composite heat shield and seal against the primary gas path air entering the ceramic matrix composite heat shield assemblies.
Figure 4:
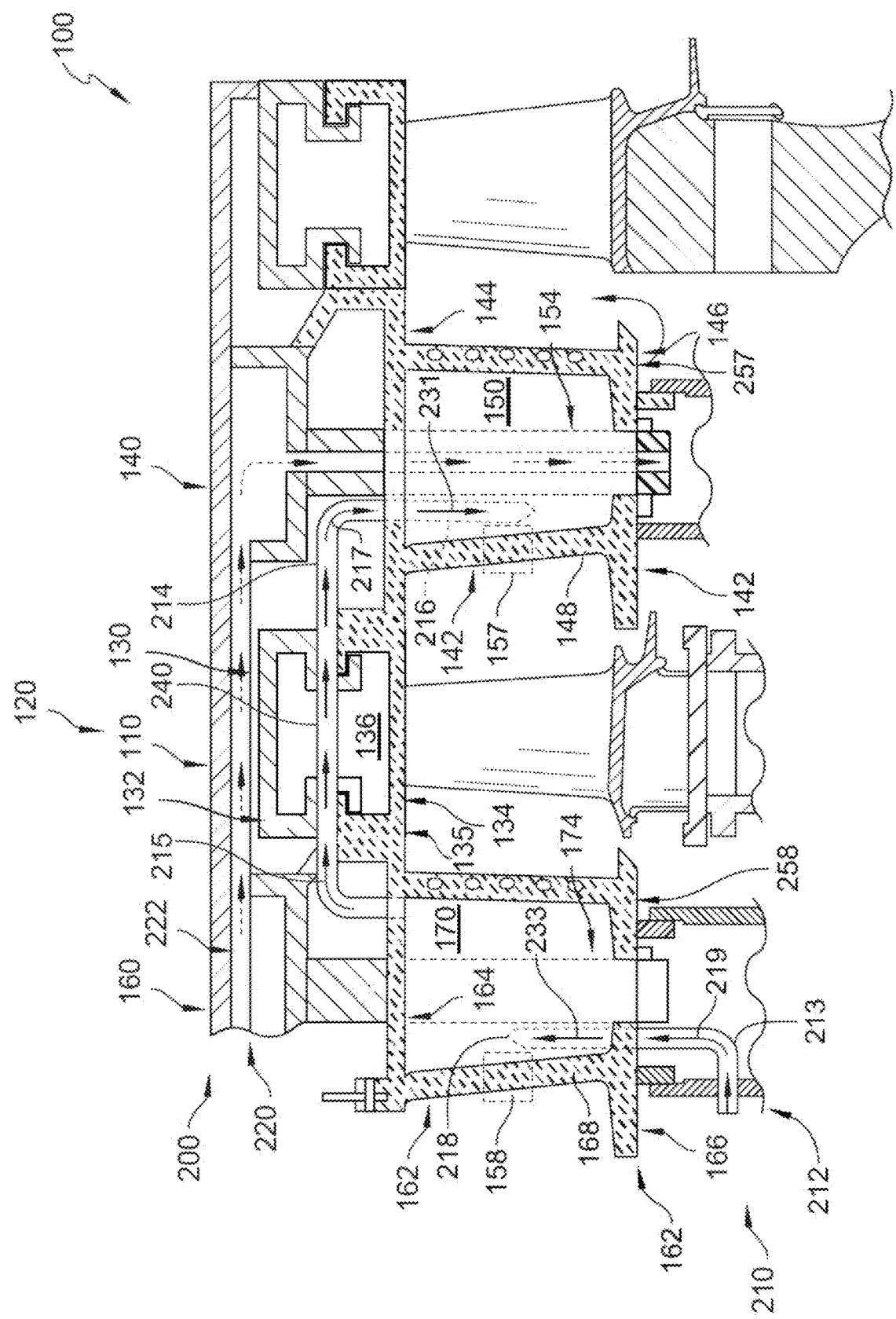
FIG. 4 is a cross-section view of a portion of another embodiment of a secondary flow assembly configured to be used in the gas turbine engine in FIG. 1 showing that compressed air entering the turbine is discharged into a first ceramic matrix composite heat shield assembly associated with a turbine vane before being recirculated into a second ceramic matrix composite heat shield assembly associated with another turbine vane, where the heated, compressed air is used to pressure the first and second ceramic matrix composite heat shield assemblies and seal against the primary gas path air entering the first and second ceramic matrix composite heat shield assemblies.

A turbine assembly 20 adapted for use in a gas turbine engine 10 is shown in FIGS. 2-4. The turbine assembly 20 includes a shroud ring assembly 30 and a vane ring assembly 40, as shown in detail in FIGS. 3 and 4. The vane ring assembly 40 includes a plurality of heat shields 42 that interact with hot gases conducted through a gas path 13 of the gas turbine engine 10 and conduct the hot gases around the vane ring assembly 40 toward a rotating turbine wheel assembly 17 located downstream of the vane ring assembly 40 as suggested in FIGS. 3 and 4.

Each heat shield 42 of the vane ring assembly 40 may be subjected to very high temperatures and pressures as a result of being downstream of a combustor 16 of the gas turbine engine 10. In the illustrative embodiment, the heat shield 42 is made from ceramic matrix composite materials, which inherently are able to withstand much higher temperatures other than materials typically utilized in gas turbine engines. The ceramic matrix composite heat shield 42 guards against the high temperatures and increases durability and useful life of the heat shield 42. The ceramic matrix composite materials forming the vane 42 may include a silicon carbide fiber preform embedded in silicon carbide matrix material. In other embodiments, another suitable ceramic matrix composite material may be used.

As a result of the heat shield 42 comprising ceramic matrix composite materials, the vane assembly 40 may utilize hotter air to pressurize and/or cool the components of the assembly 40 than would be possible with the use of other materials. To facilitate the use of hotter pressurizing/cooling air, the turbine assembly 20 further includes a secondary flow assembly 70 including a recirculating flow circuit 72 and a cooling flow circuit 92. As shown in FIG. 2, as well as further detailed in FIGS. 3 and 4, the recirculating flow circuit 72 extends from a higher pressure stage of the compressor 14, where temperatures of the hot gases of the engine 10 are much higher, to the vane ring assembly 40 after cooling a turbine shroud ring 30 of the turbine shroud ring assembly 30. The cooling flow circuit 92 extends from a lower pressure stage of the compressor 14, where temperatures of the hot gases of the engine 10 are lower, to the turbine wheel assembly 17.

The turbine assembly 20 is adapted for use in the gas turbine engine 10, which includes a fan 12, a compressor 14, the combustor 16, a turbine 18, and a turbine case 19, as shown in FIG. 1. The fan 12 is driven by the turbine 18 and provides thrust for propelling an aircraft. The compressor 14 compresses and delivers air to the combustor 16. The combustor 16 mixes fuel with the compressed air received from the compressor 14 and ignites the fuel. The hot, high pressure products of the combustion reaction in the combustor 16 are directed into the turbine 18 to cause the turbine 18 to rotate about a central axis 11 of the gas turbine engine 10 and drive the compressor 14 and the fan 12.

The turbine 18 includes the turbine case 19, the vane ring assembly 40 which includes a plurality of static vane rings 40 that are fixed relative to the central axis 11, and a plurality of bladed rotating wheel assemblies 17 as suggested in FIGS. 1, 3 and 4. Each vane ring of the vane ring assembly 40 includes a plurality of heat shields 42 disposed annularly around the vane ring 40. The hot gases are conducted through the gas path 13 and interact with the turbine wheel assemblies 17 to cause the turbine wheel assemblies 17 to rotate about the central axis 11. The vane rings 40 are positioned so as to direct the gases toward the turbine wheel assemblies 17 at a desired angle. As shown in FIGS. 3 and 4, each turbine wheel assembly 17 is circumferentially surrounded by a corresponding shroud ring 30 of the shroud ring assembly 30.

A cross-sectional view of a portion of the turbine 18, in particular the turbine assembly 20, is shown in FIG. 3. In the illustrative embodiment, the turbine assembly 20 includes a shroud ring 30 and a vane ring 40. The shroud ring 30 includes a carrier segment 32 and a blade track segment 34 coupled to the carrier segment 32. The carrier segment 32, which may be formed from metallic materials, is rigidly coupled to the turbine case 19. The blade track segment 34 is disposed around the blades 21 of the turbine wheel assembly 17, the blades 21 extending in the radial direction relative to the central axis 11. The blade track segment 34 may define a path along which the tips of the blades 21 travel when the turbine wheel assembly 17 rotates during operation of the gas turbine engine 10. In particular, the blade track segment 34 blocks hot gases flowing along the gas path 13 from passing around the blades 21 of the associated turbine wheel 17 without interacting with the blades 21. As also shown in FIG. 3, the carrier segment 32 is disposed radially outward of the blade track segment 34 and is coupled to the blade track segment 34 so as to form a shroud cavity 36.

In a preferred embodiment, the blade track segment 34 comprises ceramic matrix composite materials in order to sufficiently withstand the high temperatures of the hot gases flowing along the gas path 13 over a radially inner surface 35 of the blade track segment 34. Ceramic matrix composite materials, as used in the blade track segment 34, may have a coefficient of thermal expansion that is lower than the coefficient of thermal expansion of metallic materials, as would be utilized in the blades 21 of the turbine wheel assembly 17. This difference in coefficients of thermal expansion may result in varying gaps between the ceramic matrix composite blade track segment 34 and the metallic blades 21. As such, a clearance control mechanism may be utilized within the shroud ring 30, in particular at an interface between the carrier segment 32 and the blade track segment 34, in order to allow for thermal expansion of the blades 21 during operation of the gas turbine engine 10.

As also illustrated in FIG. 3, the turbine assembly 20 further includes the vane ring 40, which is arranged axially downstream of the shroud ring 30 along the gas path 13. The vane ring 40 includes a heat shield 42 comprising ceramic matrix composite materials and a central support spar 66 comprising metallic materials. The heat shield 42 includes an outer platform 44, an inner platform 46, and an airfoil 48, as shown in FIG. 3. The outer platform 44 defines an outer boundary of the gas path 13. The inner platform 46 is spaced apart radially from the outer platform 44 relative to the central axis 11 to define an inner boundary of the gas path 13. The airfoil 48 extends radially between and interconnects the outer platform 44 and the inner platform 46. The airfoil 48 is shaped to redirect gases flowing through the gas path 13 and to shield the support spar 66 from the hot gases in the gas path 13. The airfoil 48 is formed to define a heat shield cavity 50 that extends radially into the airfoil 48 as shown in FIG. 3. Illustratively, the heat shield cavity 50 may extend radially entirely through the outer platform 44, the inner platform 46, and the airfoil 48.

As illustrated in FIG. 3, the outer platform 44, the inner platform 46, and the airfoil 48 of the vane 42 may be integrally formed from ceramic matrix composite materials. Accordingly, the outer platform 44, the inner platform 46, and the airfoil 48 provide a single, integral, one-piece vane 42. In other embodiments, the outer platform 44, the inner platform 46, and the airfoil 48 may be formed as separate components and coupled together.

The support spar 66 is arranged inside the ceramic matrix composite airfoil 48, as shown in FIG. 3. The spar 66 includes a spar outer surface 67 and a spar inner surface 68. The spar 66 may be rigidly attached to an inner surface of the turbine case 19, and extends radially from the turbine case 19, through the heat shield cavity 50 of the vane 42, to an inner seal plate 47 attached to a radially inner surface of the inner platform 46 of the vane 42. In the illustrative embodiment, the support spar 66 is engaged directly or indirectly via load pads, seals, etc., with the airfoil 48 of the vane 42 to receive force loads from the vane 42 and to transfer the force loads to the turbine casing 19 as suggested in FIGS. 3 and 4. The spar inner surface 68 creates a feed duct 69 that may transfer cooling air through the vane assembly 40.

Figure 5:
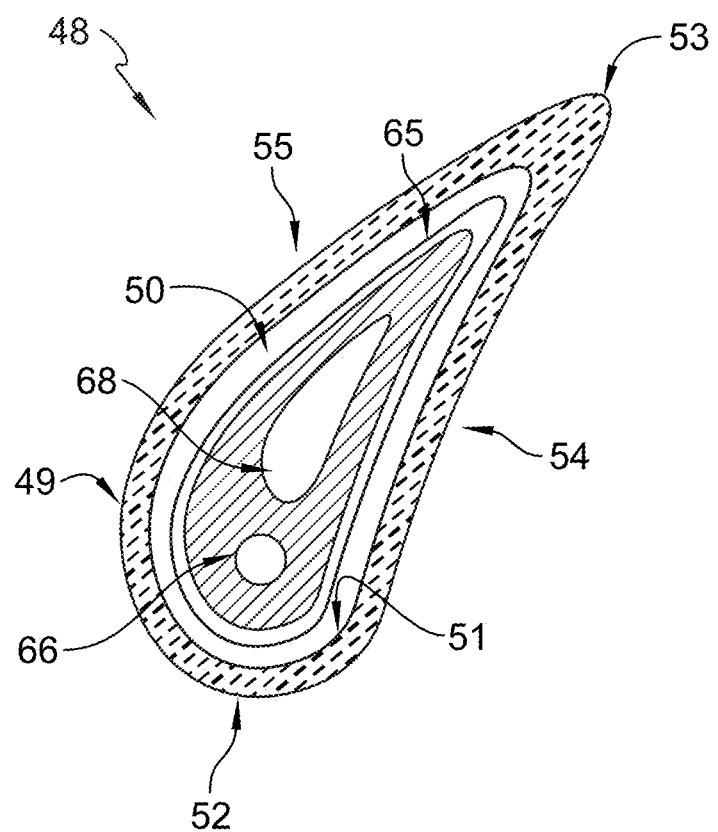
FIG. 5 is a cross-section view of an airfoil of the ceramic matrix composite heat shield with a metallic spar extending therethrough.

As shown in detail in FIG. 5, the ceramic matrix composite airfoil 48 includes an airfoil outer surface 49, an airfoil inner surface 51, a leading edge 52, a trailing edge 53, a pressure side 54, and a suction side 55. The airfoil outer surface 49 interacts with the hot gases in the gas path 13. As can be seen in FIG. 3, the airfoil inner surface 51 and the outer surface of the support spar 67 create the heat shield cavity 50 inside the ceramic matrix composite airfoil 48 that the support spar 66 extends radially through.

The leading edge 52 of the airfoil 48 is positioned axially forward of the trailing edge 53 as shown in FIG. 4. The suction side 55 is located between the leading edge 52 and the trailing edge 53. When the gas turbine engine 10 is in use, the hot gases that pass over the suction side 55 exert a pulling force on the suction side 55. Likewise, the pressure side 54 is located between the leading edge 52 and the trailing edge 53 and circumferentially adjacent to the suction side 55 on the ceramic matrix composite airfoil 48. The pressure side 54 experiences a pushing force from the hot gases of the gas path 13 when the gas turbine engine 10 is in use.

The ceramic matrix composite airfoil 48 may further include a plurality of exit holes 56 at the trailing edge 53 that extend in an axial direction between the airfoil inner surface 51 and the airfoil outer surface 49 and open into a portion 88 of the gas path 13. The plurality of exit holes 56 are configured to allow air flowing through the secondary flow assembly 70 to exit the heat shield cavity 50 at a controlled rate, as will be described in greater detail below.

In the illustrative embodiment, the secondary flow assembly 70 includes the recirculating flow circuit 72 and the cooling flow circuit 92. As shown in FIG. 3, the recirculating flow circuit 72 includes a compressor discharge tube 74 and a vane pressurizing tube 76, and may also include a focused cooling tube 78. The recirculating flow circuit 72 is configured to transport compressed air from a later stage of the compressor 14 to the turbine assembly 20.

The cooling flow circuit 92 includes a cooling flow tube 94. The cooling flow circuit 92 is configured to transport compressed air from an earlier stage of the compressor 14 to the turbine assembly 20. The compressor discharge tube 74, the vane pressurizing tube 76, and the focused cooling tube 78 may be formed from ceramic matrix composite materials, or any other material suitable for withstanding the high temperatures of later stage compressor 14 discharge air. The cooling flow tube 94 may be formed of ceramic matrix composite materials or metallic materials because of the lower temperature air flowing through the tube 94.

The compressor discharge tube 74 extends from the compressor 14 to the turbine assembly 20 through an area enclosed by the turbine case 19 that is upstream of the shroud ring 30. In other embodiments, the discharge tube 74 may extend through any portion of the gas turbine engine 10 that is or is not enclosed by the turbine case 19. In particular, the compressor discharge tube 74 extends from the compressor 14 directly to the shroud cavity 36. In some embodiments, the compressor discharge tube 74 may be shaped as a cylindrical tube or any other shape suitable for transporting hot, compressed air from the compressor 14 to the turbine assembly 20.

In the embodiment shown in FIG. 3, a first cooling air flow 82 is transported from the compressor 14 directly to the shroud cavity 36 of the shroud ring 30 via the compressor discharge tube 74. The compressor discharge tube 74 may extend into the top surface of the carrier segment 32, as shown in FIG. 3, or may extend into any portion of the shroud cavity 36 so long as the shroud cavity 36 is able to receive the first cooling air flow 82 that is transported through the compressor discharge tube 74. In at least one embodiment, the first cooling air flow 82 is hot gas flowing along the gas path 13 that is discharged from a later stage of the compressor 14, in particular a stage closer to or at the compressor 14 exit into the combustor 16. The temperatures of the gas exiting these stages is much higher than the temperatures of gas exiting at earlier stages, and can be used in the recirculating flow circuit 72 due to the various ceramic matrix composite components of the turbine assembly 20.

The vane pressurizing tube 76 extends further downstream from the shroud cavity 36 to an inlet hole 59 formed in the outer platform 44 of the vane 42 and discharges into the heat shield cavity 50. Similar to the compressor discharge tube 74, the vane pressurizing tube 76 may be shaped as a cylindrical tube or any other shape suitable for transporting hot, compressed air from the shroud cavity 36 to the heat shield cavity 50.

In the embodiment shown in FIG. 3, a pressurizing air flow 84 is transported from the shroud cavity 36 directly to the heat shield cavity 50 of the vane 42 via the vane pressurizing tube 76. The vane pressurizing tube 76 may extend axially away from the shroud cavity 36 and turn at a ninety (90) degree angle into inlet hole 59 of the outer platform 44 of the vane 42, as shown in FIG. 3, or may extend along any path so long as the heat shield cavity 50 is able to receive the pressurizing air flow 84 that is transported through the vane pressurizing tube 76.

In at least some embodiments, the recirculating flow circuit 72 further includes a focused cooling tube 78 that extends radially inward from an outlet of the vane pressurizing tube 76 approximately halfway into the heat shield cavity 50, as shown in phantom lines in FIG. 3. A focused cooling air flow 86 is transported from the outlet of the vane pressurizing tube 76 directly into the heat shield cavity 50 of the vane 42 via the focused cooling tube 78. The outlet end of the focused cooling tube 78 preferably includes a curl 79 which is bent towards the airfoil inner surface 51 of the airfoil 48 so as to direct air to the airfoil inner surface 51.

In particular, the focused cooling air flow 86 is directed onto a minority portion 57 of the airfoil 48 defined in that temperatures of the minority portion 57 exceed the temperatures of the focused cooling air flow 86, while other parts of the airfoil 48 do not. The minority portion 57 of the airfoil 48 is defined by a central portion of the leading edge 52 and/or the pressure side 54 of the airfoil outer surface 49 on which the greatest proportion of hot gases flowing along the gas path 13 contacts the airfoil 48. As a result, this minority portion 57 of the airfoil 48 experiences very high temperatures and pressures, as well as increased pneumatic loading, and thus may be susceptible to degradation over time. In order to prevent this, this minority portion 57 may be cooled by the focused cooling air flow 86 directed from the focused cooling tube 78 onto the airfoil inner surface 51 opposite the central portion of the leading edge 52 and the pressure side 54 of the airfoil exposed to the high levels of hot gases. The curl 79 of the focused cooling tube 78 may bend inwardly at a forty-five (45) degree angle, as shown in FIG. 3, or any other angle so long as air is directed at the minority portion 57 of the airfoil 48.

In other embodiments, the vane 42 may include an optional inner casing 65 (shown in FIG. 5) that extends from the outer platform 44 to the inner platform 46 and congruently surrounds the support spar 66. In such an embodiment, the pressurized air enters through the hole 59 in the outer platform 44 and into a cavity formed between the inner casing 65 and the support spar 66. The focused cooling air flow 86 may then be directed onto the minority portion 57 of the airfoil 48 via an impingement hole or a plurality of holes that extend through the inner casing 65 toward the minority portion 57 of the airfoil 48.

It can also be envisioned that, in other embodiments, the focused cooling tube 78 or impingement hole(s) may be arranged on the downstream portion of the cavity 50 such that the trailing edge 53 and/or the suction side 55 is contacted with the focused cooling air flow 86. In some embodiments, the hot air flowing along the gas path 13 may accelerate over the suction side 55 and/or the trailing edge 53, therefore increasing the fluid heat transfer coefficient. In such a scenario, focused cooling of the suction side 55 and/or the trailing edge 53 would be beneficial.

Turning now to the cooling flow circuit 92, the cooling flow tube 94 extends from the compressor 14 to the turbine wheel assembly 17. In particular, the cooling flow tube 94 extends from the compressor 14 through a rotor 23 of the turbine wheel assembly 17 and into an interior cavity 22 of the blade 21 of the turbine wheel assembly 17. In some embodiments, the cooling flow tube 94 may be shaped as a cylindrical tube or any other shape suitable for transporting hot, compressed air from the compressor 14 to the turbine wheel assembly 17.

In the embodiment shown in FIG. 3, a second cooling air flow 96 is transported from the compressor 14 directly to the interior cavity 22 of the blades 21 of the turbine wheel assembly 17 via the cooling flow tube 94. The cooling flow tube 94 may extend axially away from the compressor 14 and turn at a ninety (90) degree angle into interior cavity 22 of the blade 21, as shown in FIG. 3, or may extend along any path so long as the interior cavity 22 is able to receive the second cooling air flow 96 that is transported through the cooling flow tube 76. In at least one embodiment, the second cooling air flow 96 is hot gas flowing along the gas path 13 that is discharged from an earlier stage of the compressor 14, in particular a stage further from the compressor 14 exit into the combustor 16 than the stage(s) from which the first cooling air flow 82 originates. The temperatures of the gas exiting these stages is lower than the temperatures of gas exiting at later stages, and can be used in the cooling flow circuit 92 to cool the metallic blade 21 of the turbine wheel assembly 17, which cannot withstand as high of temperatures as the ceramic matrix composite components of the turbine assembly 20.

In some embodiments, the cooling flow circuit 92 may include a pre-swirl nozzle (not shown) that effectively accelerates the cooling fluid, and as a result reduces the cooling fluid temperature. In such an embodiment, the secondary air flow 96 may utilize air discharged from a higher pressure compressor 14 stage due to the cooling effects of the pre-swirl nozzle.

During operation, the secondary flow assembly 70 is configured to cool the shroud ring 30 and pressurize the vane 42 of the vane ring 40 via the recirculating flow circuit 72. The secondary flow assembly 70 is also configured to cool the turbine wheel assembly 17 via the cooling flow circuit 92. In particular, in the embodiment shown in FIG. 3, the first cooling air flow 82 flows from the compressor 14 through the compressor discharge tube 74 and discharges into the shroud cavity 36. When the first cooling air flow 82 enters the shroud cavity, the first cooling air flow 82 comes into contact with the hot ceramic matrix composite blade track segment 34 of the shroud ring 30 that has been heated during operation of the gas turbine engine 10. Because of the high temperature tolerance of ceramic matrix composite materials, the hot first cooling air flow 82 can be used to cool the blade track segment 34.

The high temperature tolerance of the blade track segment 34 advantageously allows for the use of the high temperature air discharged from later stages of the compressor 14 or the compressor 14 exit into the combustor 16, which likely has also picked up additional heat while passing through the cooling and ventilation cavities of the engine 10. This high temperature air sometimes cannot be utilized for downstream cooling due to the lower temperature tolerances of downstream components typically used with gas turbine engines 10. Thus, instead of discarding the high temperature air into the gas path 13, the air can be used to cool the ceramic matrix composite blade track segment 34, as shown in the illustrative embodiment. It can be envisioned that the high temperature air can be used to cool other downstream components of the gas turbine engine 10 as well, potentially eliminating the need for dedicated cooling flows from the compressor 14 to the turbine 18. Eliminating dedicated cooling flows could have significant engine cycle benefits, reducing the physical core size and improving thermal and propulsive efficiencies. Moreover, the potential benefit is compounded if the turbine blades 21 are constructed from ceramic matrix composite materials as well.

As shown in FIG. 3, after the first cooling air flow 82 enters the shroud cavity 36 and cools the blade track segment 34, the air exits the shroud cavity 36 into the vane pressurizing tube 76. The air, now considered the vane pressurizing flow 84, travels through the vane pressurizing tube 76 and exits into the heat shield cavity 50. In at least one embodiment, the recirculating flow circuit 72 does not include the focused cooling tube 78, and as such, the vane pressurizing tube 76 allows the pressurizing air flow 84 to exit the vane pressurizing tube 76 directly into the heat shield cavity 50. When the pressurizing air flow 84 fills the heat shield cavity 50, the pressurizing air flow 84 pressurizes the heat shield cavity 50, and in turn, pressurizes the vane 42 to the pressure of the pressurizing air flow 84.

In the illustrative embodiment, the heat shield cavity 50 and the shroud cavity 36, being filled with the high pressure, hot pressurizing air flow 84 advantageously results in lower thermal gradients and lower pressure gradients. In particular, typical dedicated cooling flows from earlier stages of the compressor 14 result in large thermal and pressure gradients due to the large difference in temperature and pressure between the gases flowing along the gas path 13 and the dedicated cooling flows interacting with the components of the turbine assembly 20. Utilizing higher pressure, hotter air within the vane 40 and shroud ring 30 reduces these gradients, and as a result, minimizes the mechanical loads induced on the components of the turbine assembly 20, in particular the ceramic matrix composite components. Additionally, thermal stresses on the components of the turbine assembly 20 are reduced.

In the illustrative embodiment, the temperature of the pressurizing air flow 84 is greater than the temperature of a majority portion 58 of the airfoil 48 during a max takeoff use condition of the gas turbine engine 10. The majority portion 58 includes substantially all of the airfoil 48 that is not included in the minority portion 57 described above. In this embodiment, the temperature of the pressurizing air flow 84 being higher than the majority portion 58 does not allow for the pressurizing air flow 84 to cool the majority portion 58 of the airfoil 48.

As used herein, the phrase "max takeoff use condition" refers to a condition of the gas turbine engine 10 which typically generates the highest stresses and temperatures in the engine 10. This condition is typically present during takeoff or lift-off of the aircraft on which the engine 10 is affixed.

As also shown in FIG. 3, after the air exits the vane pressurizing tube 76, the air, now considered the focused cooling air flow 86 may flow into the focused cooling tube 78. As discussed above, the focused cooling tube 78 is configured to discharge the focused cooling air flow 86 onto the minority portion 57 of the airfoil 48. In some embodiments, the minority portion 57 of the airfoil 48 possesses a higher temperature than the focused cooling air flow 86, and thus the focused cooling air flow 86 can be utilized to cool the superheated minority portion 57 of the airfoil 48.

In at least one embodiment, the pressurized air 84, 86 that is pressurizing the heat shield cavity 50 may exit through the trailing edge 53 of the airfoil 48 via the plurality of exit holes 56 and into the cooling passage 88. The exit holes 56 may be aligned in a radial direction along the trailing edge 53 of the airfoil 48, as shown in FIG. 3. It can also be envisioned that the plurality of exit holes 56 are arranged in other patterns, or that only a single exit hole 56 is arranged on the trailing edge 53.

FIG. 4 shows an embodiment of a turbine assembly 100 to be used in place of the turbine assembly 20 described above. The turbine assembly 100 is substantially similar to the turbine assembly 20 of the embodiment shown in FIG. 3 and is adapted for use in the gas turbine engine 10. In the exemplary embodiment, the turbine assembly 100 includes a shroud ring assembly 110 and a vane ring assembly 120, which are also formed to be substantially similar to the shroud ring 30 and the vane ring 40. The shroud ring assembly 110 may include a plurality of shroud rings 130, and the vane ring assembly 120 may include a plurality of vane rings 140.

In the embodiment shown in FIG. 4, the shroud ring assembly 110 includes a shroud ring 130 having a carrier segment 132 and a blade track segment 134 coupled to the carrier segment 132 formed identically to the carrier segment 32 and the blade track segment 34 described above. The blade track segment 134 is disposed around the blades 21 of the turbine wheel assembly 17. The carrier segment 132 is disposed radially outward of the blade track segment 134 and is coupled to the blade track segment 134 so as to form a shroud cavity 136. In a preferred embodiment, the blade track segment 134 comprises ceramic matrix composite materials in order to sufficiently withstand the high temperatures of the hot gases flowing along the gas path 13 over a radially inner surface 135 of the blade track segment 134.

As also illustrated in FIG. 4, the turbine assembly 100 further includes the vane ring assembly 120 having two vane rings 140, 160. The first vane ring 140 is arranged axially downstream of the shroud ring 130, and the second vane ring 160 is arranged axially upstream of the shroud ring 130. Each vane ring 140, 160 is formed identically to the vane ring 40 described above. In some embodiments, as shown in FIG. 4, the two vane rings 140, 160 and the shroud ring 130 may be formed as a single CMC part. In other embodiments, the two vane rings 140, 160 and the shroud ring 130 be formed as separate components.

In particular, each vane ring 140, 160 includes a heat shield 142, 162 comprising ceramic matrix composite materials and a central support spar 154, 174 comprising metallic materials. The heat shield 142, 162 includes an outer platform 144, 164, an inner platform 146, 166 and an airfoil 148, 168 as shown in FIG. 4. The airfoil 148, 168 extends radially between and interconnects the outer platform 144, 164 and the inner platform 146, 166, respectively. The airfoil 148 is formed to define a heat shield cavity 150, 170 that extends radially into the airfoil 148, 168, as shown in FIG. 4. Illustratively, the heat shield cavity 150, 170 may extend radially entirely through the outer platform 144, 164, the inner platform 146, 166, and the airfoil 148, 168.

In the embodiment shown in FIG. 4, the turbine assembly 100 also includes a secondary flow assembly 200 that includes the recirculating flow circuit 210 and the cooling flow circuit 220. As shown in FIG. 3, the recirculating flow circuit 210 includes a discharge tube 212 and a vane pressurizing tube 214, and may also include a first focused cooling tube 216 and a second focused cooling tube 218. The components of the secondary flow assembly 200 are formed substantially similarly to the secondary flow assembly 72 described above, but are arranged differently in order to function with both the first and second vane rings 140, 160. The recirculating flow circuit 210 is configured to transport compressed air from a later upstream stage of the gas turbine engine 10 to the turbine assembly 100.

In the preferred embodiment, the cooling flow circuit 220 includes a cooling flow tube 222. The cooling flow circuit 220 is configured to transport compressed air from an earlier stage of the gas turbine engine 10 to the turbine assembly 100.

Regarding the recirculating flow circuit 210, the discharge tube 212 includes a first portion 213 and a second portion 215. The first portion 213 extends from the an upstream stage of the gas turbine engine 10 to the turbine assembly 100 directly to the heat shield cavity 170 of the second heat shield 162. In the embodiment shown in FIG. 4, a second pressurizing air flow 219 is transported from the upstream stage of the gas turbine engine 10 directly to the heat shield cavity 170 of the second heat shield 162 via the discharge tube 212.

The second portion 215 of the discharge tube 212 extends out of the second heat shield cavity 170 and into a bypass tube 240 that extends through the shroud cavity 136. As shown in FIG. 4, the bypass tube 240 does not open into the shroud cavity 136, and instead passes completely through the cavity 136 and into the vane pressurizing tube 214. In an alternative embodiment, the bypass tube 240 may open up into the shroud cavity 136, allowing the compressed air to cool the blade track segment 134.

The vane pressurizing tube 214 extends further downstream from the bypass tube 240 to the heat shield cavity 150 of the first heat shield 142. In the embodiment shown in FIG. 4, the compressed air passing through the assembly, now considered a first pressurizing air flow 217, is transported from the bypass tube 240 directly to the heat shield cavity 150 of the first vane 142 via the vane pressurizing tube 214.

In at least some embodiments, the recirculating flow circuit 210 further includes a first focused cooling tube 216 disposed in the first heat shield cavity 150, and may further include a second cooling tube 218 disposed in the second heat shield cavity 170. Each focused cooling tube 216, 218 extends radially inward from an outlet of the first portion 213 of the discharge tube 212 and an outlet of the vane pressurizing tube 214, respectively. A focused cooling air flow 231, 233 is transported through the focused cooling tube 216, 218 and directly onto an inner surface of each heat shield 142, 162. Similarly to the heat shield 42 described above, the focused cooling air flow 231, 233 is directed onto a minority portion 157, 158 of the airfoil 148, 168. The minority portion 157 of the airfoil 148, 168 is defined by a central portion of a leading edge and/or a pressure side of the airfoil 148, 168 on which the greatest proportion of hot gases flowing along the gas path 13 contacts the airfoil 148, 168. The minority portion 157, 158 of each airfoil 148, 168 may be cooled by the focused cooling air flow 231, 233 directed from the focused cooling tube 216, 218 onto the inner surface of the air foil 148, 168.

Turning now to the cooling flow circuit 220, the cooling flow tube 222 extends from an earlier stage of the gas turbine engine 10 to the turbine assembly 100. In the embodiment shown in FIG. 4, a cooling air flow 260 is transported from earlier stage of the gas turbine engine 10 directly to an interior cavity of the support spar 154 so as to cool the spar 154 and its surrounding components. In at least one embodiment, the cooling flow tube 222 discharges into both support spars 154, 174 of both heat shields 142, 162. In other embodiments, the secondary flow assembly 200 does not include a cooling flow circuit 220, as the recirculating flow circuit 210 is capable of cooling the various engine components on its own.

During operation, the secondary flow assembly 200 is configured to pressurize the heat shields 142, 162 of the vane rings 140, 160 via the recirculating flow circuit 210, and also optionally configured to cool the spars 154, 174 via the cooling flow circuit 220. In particular, in the embodiment shown in FIG. 4, the second pressurizing air flow 219 flows from an upstream stage through the first portion 213 of the discharge tube 212 and discharges into the second heat shield cavity 170. Optionally, if the circuit 210 includes a second focused cooling tube 218, the second pressurizing air flow 219 will enter the second focused cooling tube 218. Subsequently, the second focused cooling tube 218 will discharge the air flow 219 as a second focused cooing flow 233 onto the minority portion 158 of the airfoil 168 of the second heat shield 162. In the illustrative embodiment, the second pressurizing air flow 219 or the focused cooling air flow 233 pressurizes the heat shield cavity 170.

As shown in FIG. 4, the air exits the second heat shield cavity 170 into the second portion 215 of the discharge tube 212. The air travels past the shroud cavity 136 via the bypass tube 240 and exits into the vane pressurizing tube 214. Similarly to the second heat shield 162, the air flow, now considered a first pressurizing air flow 217, flows from bypass tube 240, through the vane pressurizing tube 214, and discharges into the first heat shield cavity 150. Optionally, if the circuit 210 includes a first focused cooling tube 216, the first pressurizing air flow 217 will enter the first focused cooling tube 216. Subsequently, the second focused cooling tube 216 will discharge the air flow 217 as a first focused cooing flow 231 onto the minority portion 157 of the airfoil 148 of the second heat shield 142. In the illustrative embodiment, the first pressurizing air flow 217 or the focused cooling air flow 231 pressurizes the heat shield cavity 150.

In the illustrative embodiment, the temperature of the first and second pressurizing air flows 217, 219 is greater than the temperature of a majority portion 257, 258 of the airfoils 148, 168 during a max takeoff use condition of the gas turbine engine 10. The majority portion 257, 258 includes substantially all of the airfoil 148, 168 that is not included in the minority portion 157, 158 described above. In this embodiment, the higher temperature of the pressurizing air flows 217, 219 as compared to the temperature of the majority portions 257, 258 allows for the pressurizing air flows 217, 219 to pressurize the heat shield cavities 150, 170. The temperature of the pressurizing air flows 217, 219 being higher than the majority portions 257, 258, however, does not allow for the pressurizing air flows 217, 219 to cool the majority portions 257, 258 of the airfoils 148, 168.

In some embodiments, the minority portions 157, 158 of the airfoils 148, 168 possess a higher temperature than the focused cooling air flows 231, 233, and thus the focused cooling air flows 231, 233 can be utilized to cool the superheated minority portions 157, 158 of the airfoils 148, 168.

In at least some embodiments, the pressurization of the heat shield cavities 50, 150, 170, compared to typical turbine nozzle guide vanes, encourages through flow of upstream leakages permeating through interfaces between components that would otherwise be discarded into the gas path 13. The leakages may include, for example, fluid leaking between the shroud rings 30 and the vane rings 40. The through flow may potentially improve the aerodynamic spoiling of the gas turbine engine 10.

Illustratively, the higher quality of the ceramic matrix composite material, the higher temperature air that the components can tolerate. Similarly, the quality of the metallic materials will affect maximum useable temperatures. In at least some embodiments, the turbine assembly 20, 100 can be considered a heat exchanger where the cooling flow will reach a peak temperature but will then reduce as the main gas flow path 13 flow temperature decrease through the turbine 18. As such, the most capable ceramic matrix composite components may be used further upstream in the turbine 18, while the less capable materials (and potentially cheaper) being used downstream. It can also be envisioned that the turbine assemblies 20, 100 described above may be utilized throughout any of the stages of the turbine 18 section of the gas turbine engine 10, as well as in combination with multiple stages.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine, comprising
a shroud ring configured to extend around an associated turbine wheel and to block gases from passing around blades of the associated turbine wheel without interacting with the blades, the shroud ring including a carrier segment configured to be coupled to a turbine case and a blade track segment comprising ceramic matrix composite materials mounted to the turbine case via the carrier segment, the blade track segment and the carrier segment defining a shroud cavity radially there between, the blade track segment configured to interact with the gases flowing along a primary gas path of the gas turbine engine,
a vane ring including a heat shield comprising ceramic matrix composite materials that forms an outer platform defining an outer boundary of the primary gas path, an inner platform radially spaced apart from the outer platform and defining an inner boundary of the primary gas path, and an airfoil extending radially between the outer platform, wherein the inner platform, the airfoil, the outer platform, and the inner platform define a heat shield cavity radially through the heat shield, the vane ring further including a spar located in the heat shield cavity and extending radially through the outer platform, the heat shield cavity, and the inner platform, the spar including a spar cavity extending longitudinally through the spar, and
a secondary flow assembly including a recirculating flow circuit, the recirculating flow circuit having (i) a compressor discharge tube extending from a compressor of the gas turbine engine to the shroud cavity and (ii) a vane pressurizing tube extending from the shroud cavity to the heat shield cavity, wherein the recirculating flow circuit is configured to carry a first cooling air flow from the compressor into the shroud cavity via the compressor discharge tube so that the blade track segment is cooled, and is further configured to carry a pressurizing air flow flowing from the shroud cavity into the heat shield cavity via the vane pressurizing tube so that the heat shield cavity is pressurized thereby providing a seal against the gases from the primary gas path entering the heat shield cavity,
wherein the recirculating flow circuit further includes a focused cooling tube connected to the vane pressurizing tube and extending from the vane pressurizing tube into the heat shield cavity, and
wherein the focused cooling tube is axially offset from the spar cavity.

2. The gas turbine engine of claim 1, wherein the gas turbine engine is configured so that a temperature of the pressurizing air flow is greater than a temperature of a majority portion of the airfoil during a max takeoff use condition of the gas turbine engine such that the pressurizing air flow is primarily effective to pressurize the heat shield cavity and is not effective for cooling the majority portion of the airfoil during the max takeoff use condition.

3. The gas turbine engine of claim 2, wherein the focused cooling tube is configured to direct the pressurizing air flow only onto a minority portion of the airfoil that is at a temperature greater than the temperature of the pressurizing air flow during the max takeoff use condition so as to provide a focused cooling flow.

4. The gas turbine engine of claim 3, wherein
the airfoil includes a leading edge, a trailing edge axially spaced apart from the leading edge, a pressure side located between the leading edge and the trailing edge, and a suction side spaced apart from the pressure side and located between the leading edge and the trailing edge, and
the gases flowing along the primary gas path exert a pushing force on the leading edge and on the pressure side.

5. The gas turbine engine of claim 4, wherein the minority portion of the airfoil is located at a radially central portion of the airfoil located on at least one of the leading edge and the pressure side, wherein the minority portion of the airfoil is defined by a portion of the leading edge and the pressure side that possesses a first airfoil temperature that is greater than a second airfoil temperature of a remaining portion of the leading edge and the pressure side, and wherein the temperature of the pressurizing air flow is greater than the second airfoil temperature of the remaining portion of the leading edge and the pressure side.

6. The gas turbine engine of claim 5, wherein the vane pressurizing tube extends from the shroud cavity, through the outer platform, and to the focused cooling tube so as to interconnect the shroud cavity and the focused cooling tube, and wherein the focused cooling tube includes a terminal end having a bend such that the terminal end is directed only at the minority portion at an angle relative to the leading edge.

7. The gas turbine engine of claim 4, wherein
the trailing edge includes a plurality of exit holes arranged radially along the trailing edge, and
the focused cooling flow is configured to flow out of the heat shield cavity via the plurality of exit holes.

8. The gas turbine engine of claim 1, wherein
the spar comprises metallic materials, and
the spar is configured to receive force loads applied to the airfoil by the gases flowing along the primary gas path when the gas turbine engine is in use.

9. The gas turbine engine of claim 1, wherein the first cooling air flow is discharged from a compressor exit of the compressor when the gas turbine engine is in use.

10. The gas turbine engine of claim 1, wherein the turbine is configured such that a temperature of the pressurizing air flow is greater than a temperature of a majority portion of the first airfoil, wherein the recirculating flow circuit further includes a bypass tube extending between a discharge end of the compressor discharge tube and an inlet end of the vane pressurizing tube, wherein the vane ring further includes a second heat shield having a second airfoil defining a second heat shield cavity within the second airfoil radially through the second heat shield, and wherein the second heat shield is arranged axially upstream of the shroud ring and the heat shield relative to the primary gas path.

11. A turbine assembly for use with a gas turbine engine, the turbine assembly comprising
  a shroud ring assembly including a carrier segment and a blade track segment comprising ceramic matrix composite materials,
  a vane ring assembly including a first heat shield comprising ceramic matrix composite materials and having a first airfoil defining a first heat shield cavity within the first airfoil radially through the first heat shield, and
  a secondary flow assembly including a recirculating flow circuit, the recirculating flow circuit having (i) a discharge tube that extends to the shroud ring assembly and (ii) a vane pressurizing tube that extends from the shroud ring assembly to the first heat shield cavity, the recirculating flow circuit configured to carry a first pressurizing air flow that pressurizes the first heat shield cavity and seals against gases flowing along the primary gas path entering the first heat shield cavity,
  wherein the turbine is configured such that a temperature of the first pressurizing air flow is greater than a temperature of a majority portion of the first airfoil, and
  wherein the recirculating flow circuit further includes a bypass tube extending between a discharge end of the discharge tube and an inlet end of the vane pressurizing tube.

12. The turbine assembly of claim 11, wherein
  the blade track segment and the carrier segment defining a shroud cavity,
  the discharge tube is configured to discharge into the shroud cavity,
  the recirculating flow circuit is configured to cool the shroud ring assembly with a first cooling air flow flowing into the shroud cavity via the discharge tube, and
  the first pressurizing air flow flows from the shroud cavity into the heat shield cavity via the vane pressurizing tube.

13. The turbine vane assembly of claim 12, wherein the recirculating flow circuit further includes a first focused cooling tube connected to the vane pressurizing tube and extending from the vane pressurizing tube into the first heat shield cavity, the first focused cooling tube configured to direct a focused cooling flow onto a minority portion of the airfoil that is at a temperature greater than the temperature of the first pressurizing air flow during a maximum takeoff use condition so as to provide a focused cooling flow.

14. The turbine assembly of claim 11, wherein
  the vane ring assembly further includes a second heat shield having a second airfoil defining a second heat shield cavity within the second airfoil radially through the second heat shield, and
  the second heat shield is arranged axially upstream of the shroud ring assembly and the first heat shield relative to the primary gas path.

15. The turbine assembly of claim 14, wherein
  the discharge tube includes a first portion and a second portion,
  the first portion discharges into the second heat shield cavity,
  the second portion extends from the second heat shield cavity to the bypass tube,
  the recirculating flow circuit is further configured to pressurize the second heat shield cavity and seal against gases flowing along the primary gas path entering the second heat shield cavity with a second pressurizing air flow flowing into the second heat shield cavity via the first portion of the discharge tube, and
  the second pressurizing air flow flows from the second heat shield cavity through the second portion of the discharge tube and through the bypass tube to the inlet end of the vane pressurizing tube.

16. The turbine vane assembly of claim 15, wherein
  the recirculating flow circuit further includes at least one of a first focused cooling tube and a second focused cooling tube,
  the first focused cooling tube is connected to the vane pressurizing tube and extends from the vane pressurizing tube into the first heat shield cavity,
  the first focused cooling tube is configured to direct a first focused cooling flow onto a first minority portion of the first airfoil that is at a temperature greater than the temperature of the first pressurizing air flow during the max takeoff use condition so as to provide a focused cooling flow,
  the second focused cooling tube is connected to the first portion of the discharge tube and extends from the first portion of the discharge tube into the second heat shield cavity, and
  the second focused cooling tube is configured to direct a second focused cooling flow onto a second minority portion of the second airfoil that is at a temperature greater than the temperature of the second pressurizing air flow during the max takeoff use condition so as to provide a focused cooling flow.

17. The turbine vane assembly of claim 11, wherein
  the vane ring assembly further includes a spar comprising metallic materials and located in the first heat shield cavity, the spar extending radially through the first heat shield cavity,
  the spar includes a spar cavity extending longitudinally through the spar,
  the spar is configured to receive force loads applied to the first airfoil by the gases flowing along the primary gas path when the gas turbine engine is in use,
  the secondary flow assembly further includes a cooling flow circuit, the cooling flow circuit having a cooling flow tube extending from a second upstream stage of the gas turbine engine into the spar cavity, and
  the cooling flow circuit is configured to cool the spar with a second cooling flow flowing into the spar cavity via the cooling flow tube.

18. A method comprising
  providing a shroud ring assembly of a gas turbine engine including a carrier segment and a blade track segment comprising ceramic matrix composite materials, the blade track segment and the carrier segment defining a shroud cavity,
  providing a vane ring assembly of the gas turbine engine including a heat shield comprising ceramic matrix composite and having an airfoil defining a heat shield cavity within the airfoil radially through the heat shield, the vane ring assembly further including a spar located in the heat shield cavity, the spar including a spar cavity extending longitudinally through the spar,
  cooling the shroud ring assembly with a cooling air flow flowing from an upstream stage of the gas turbine engine to the shroud cavity via a discharge tube of a recirculating flow circuit of a secondary flow assembly of the gas turbine engine, the discharge tube extending from the upstream stage of the gas turbine engine to the shroud cavity and discharging into the shroud cavity, and pressurizing the heat shield cavity with a pressurizing air flow flowing from the shroud cavity into the heat shield cavity via a vane pressurizing tube of the recirculating flow circuit, the vane pressurizing tube extending from the shroud cavity to the heat shield cavity and discharging into the heat shield cavity, wherein the recirculating flow circuit further includes a focused cooling tube connected to the vane pressurizing tube and extending from the vane pressurizing tube into the heat shield cavity, and wherein the focused cooling tube is axially offset from the spar cavity.

* * * * *